United States Patent
Karukuri et al.

(10) Patent No.: US 12,131,624 B2
(45) Date of Patent: Oct. 29, 2024

(54) MAINTENANCE PREDICTION FOR DEVICES OF A FIRE SYSTEM

(71) Applicant: Honeywell International Inc., Charlotte, NC (US)

(72) Inventors: Vijaya Kumar Karukuri, Bangalore (IN); Sundararaman Venkateswaran, Chennai (IN); Nagaraj Rajappan, Bangalore (IN); James Llewellyn van Brampton, Charlotte, NC (US); Mahadevan Somasundram Balakrishnan, Chennai (IN); Gaddigesh Nagappa Admani, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 138 days.

(21) Appl. No.: 17/895,352

(22) Filed: Aug. 25, 2022

(65) Prior Publication Data
US 2024/0071205 A1 Feb. 29, 2024

(51) Int. Cl.
G08B 29/14 (2006.01)
G08B 29/18 (2006.01)

(52) U.S. Cl.
CPC ......... *G08B 29/145* (2013.01); *G08B 29/185* (2013.01)

(58) Field of Classification Search
CPC .... G08B 29/145; G08B 29/185; G08B 17/00; G08B 25/14; G08B 25/003; G05B 23/0283; G06Q 10/20
See application file for complete search history.

(56) References Cited

U.S. PATENT DOCUMENTS

| | | | |
|---|---|---|---|
| 5,950,150 A * | 9/1999 | Lloyd | A62C 37/50 714/809 |
| 7,804,402 B2 | 9/2010 | Lang et al. | |
| 9,911,317 B2 | 3/2018 | Breed et al. | |
| 10,359,771 B2 | 7/2019 | Trainor | |
| 10,969,775 B2 | 4/2021 | Khalate et al. | |
| 11,043,111 B1 * | 6/2021 | Escofet Via | G08B 29/16 |
| 11,232,703 B1 * | 1/2022 | Wolf | H04L 63/0876 |
| 11,236,896 B1 * | 2/2022 | Schiel | F21S 4/28 |

(Continued)

FOREIGN PATENT DOCUMENTS

| | | |
|---|---|---|
| EP | 3139359 | 3/2017 |
| EP | 3229186 A1 | 10/2017 |
| WO | 2019079862 A1 | 5/2019 |

OTHER PUBLICATIONS

Bosch; Fire Alarm Systems, "Remote Monitoring of Fire Alarm Systems" 2021 (22 pgs) https://www.boschsecurity.com/xc/en/solutions/fire-alarm-systems/remote-monitoring-fire-alarm-systems/.

*Primary Examiner* — Curtis J King
(74) *Attorney, Agent, or Firm* — Brooks, Cameron & Huebsch, PLLC

(57) ABSTRACT

Devices, systems, and methods for maintenance prediction for devices of a fire system are described herein. In some examples, one or more embodiments include a computing device comprising a memory and a processor to execute instructions stored in the memory to receive fire system device data of a fire device in a fire system and generate a fire device analysis based on the fire system device data, where the fire device analysis includes a predicted behavior of the fire device and a predicted timeline for the predicted behavior of the fire device.

17 Claims, 5 Drawing Sheets

(56) References Cited

U.S. PATENT DOCUMENTS

| | | | | |
|---|---|---|---|---|
| 11,340,097 | B1* | 5/2022 | Deutsch | G08B 17/00 |
| 2002/0101345 | A1* | 8/2002 | Pattok | G08B 29/145 |
| | | | | 340/628 |
| 2003/0234732 | A1* | 12/2003 | Rhodes | G08B 17/10 |
| | | | | 340/870.16 |
| 2005/0128079 | A1* | 6/2005 | Berezowski | G08B 1/08 |
| | | | | 340/539.22 |
| 2006/0139161 | A1* | 6/2006 | Beghelli | H05B 47/19 |
| | | | | 340/539.1 |
| 2008/0084291 | A1* | 4/2008 | Campion | G08B 29/145 |
| | | | | 340/514 |
| 2009/0184816 | A1* | 7/2009 | Hosey | G08B 29/14 |
| | | | | 340/506 |
| 2010/0308853 | A1* | 12/2010 | Pullen | F04D 15/0088 |
| | | | | 324/750.05 |
| 2015/0077242 | A1* | 3/2015 | Simoncic | G08B 29/145 |
| | | | | 340/514 |
| 2015/0088346 | A1* | 3/2015 | Lee | B63B 49/00 |
| | | | | 356/32 |
| 2015/0248832 | A1* | 9/2015 | Piccolo, III | G08B 29/145 |
| | | | | 340/514 |
| 2015/0348399 | A1* | 12/2015 | Cree | G06F 3/0488 |
| | | | | 715/740 |
| 2016/0007179 | A1* | 1/2016 | Kim | G08B 7/066 |
| | | | | 455/404.1 |
| 2016/0093203 | A1* | 3/2016 | Hamilton | A62C 37/44 |
| | | | | 709/224 |
| 2016/0148498 | A1* | 5/2016 | Ruszala | G08B 25/003 |
| | | | | 340/506 |
| 2017/0032661 | A1* | 2/2017 | Moffa | G08B 29/145 |
| 2017/0084160 | A1* | 3/2017 | Piccolo, III | G08B 25/001 |
| 2017/0186297 | A1* | 6/2017 | Brenner | H04W 4/021 |
| 2017/0193811 | A1* | 7/2017 | Stowell | G08B 29/145 |
| 2017/0278381 | A1* | 9/2017 | Nalukurthy | G08B 29/145 |
| 2018/0012173 | A1* | 1/2018 | Leen | G06Q 10/06 |
| 2018/0012482 | A1* | 1/2018 | Brown | G05B 15/02 |
| 2018/0114431 | A1* | 4/2018 | Volam | G08B 29/12 |
| 2018/0122221 | A1* | 5/2018 | Norton | G08B 25/10 |
| 2018/0204435 | A1 | 7/2018 | Hilsinger | |
| 2018/0308475 | A1* | 10/2018 | Locke | G06F 40/279 |
| 2020/0066125 | A1* | 2/2020 | Boguslawski | G08B 17/10 |
| 2020/0394900 | A1* | 12/2020 | Lontka | G06T 7/90 |
| 2020/0402381 | A1* | 12/2020 | Nelson | G08B 7/06 |
| 2021/0049881 | A1* | 2/2021 | Connell | H04L 41/06 |
| 2021/0060391 | A1* | 3/2021 | Legg | A63B 24/0003 |
| 2021/0108351 | A1* | 4/2021 | Patterson | D06F 34/28 |
| 2021/0142651 | A1* | 5/2021 | Kybarshi | G08B 25/016 |
| 2021/0149011 | A1* | 5/2021 | Wetzker | G01S 5/02525 |
| 2021/0183231 | A1* | 6/2021 | Arellano Valderrama | |
| | | | | G08B 25/04 |
| 2021/0350692 | A1* | 11/2021 | Nalukurthy | G06F 16/248 |
| 2021/0350693 | A1* | 11/2021 | Nalukurthy | G08B 17/00 |
| 2022/0019211 | A1 | 1/2022 | Ramachandran et al. | |
| 2022/0241634 | A1* | 8/2022 | Krutskevych | A62C 35/68 |
| 2022/0254247 | A1* | 8/2022 | Wolf | G08B 29/14 |
| 2022/0319305 | A1* | 10/2022 | Escofet Via | G08B 25/045 |
| 2023/0216290 | A1* | 7/2023 | Aksoy | H02H 7/20 |
| | | | | 307/84 |
| 2023/0351883 | A1* | 11/2023 | Liese | G08B 29/145 |
| 2023/0368651 | A1* | 11/2023 | Cho | G08B 29/188 |

\* cited by examiner

MAINTENANCE PREDICTION FOR DEVICES OF A FIRE SYSTEM

TECHNICAL FIELD

The present disclosure relates to devices, systems, and methods for maintenance prediction for devices of a fire system.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire) to warn occupants to evacuate. Such an alarm system may include a fire system having a fire panel (e.g., a fire control panel) and a number of fire system devices (e.g., sensors, sounders, pull stations, etc.) located throughout the facility (e.g., on different floors and/or in different rooms of the facility) that can perform an action when a hazard event is occurring in the facility and provide a notification of the hazard event to the occupants of the facility via alarms or other mechanisms.

DETAILED DESCRIPTION

Figure 1:
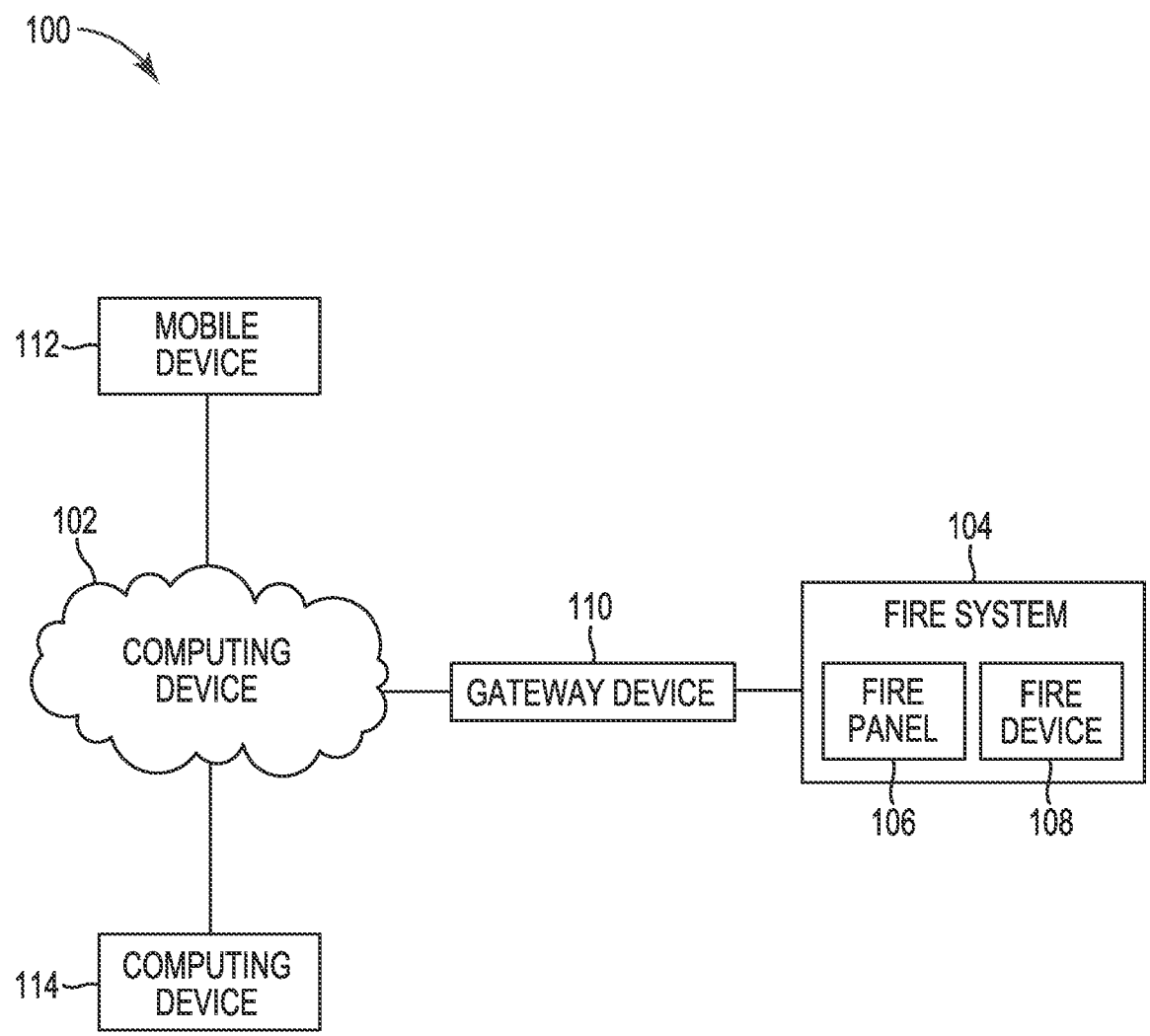
FIG. 1 is an example of a system for maintenance prediction for devices of a fire system, in accordance with one or more embodiments of the present disclosure.

Devices, systems, and methods for maintenance prediction for devices of a fire system are described herein. In some examples, one or more embodiments include a computing device comprising a memory and a processor to execute instructions stored in the memory to receive fire system device data of a fire device in a fire system and generate a fire device analysis based on the fire system device data, where the fire device analysis includes a predicted behavior of the fire device and a predicted timeline for the predicted behavior of the fire device.

A facility can utilize a fire system in order to warn occupants of the facility of an emergency event, such as a fire. As used herein, the term "fire system" refers to a system of devices to provide an audible and/or visible warning in an emergency event. For example, the fire system can utilize fire devices to warn occupants of the emergency event occurring in the space, such as a fire. As used herein, the term "fire device" refers to a device that can receive an input relating to an event and/or generate an output relating to an event. Such fire devices can be a part of the fire system of a space in a facility/in the facility at large and can include devices such as fire sensors, smoke detectors, heat detectors, carbon monoxide (CO) detectors, or combinations of these; interfaces; manual call points (MCPs), pull stations; input/output modules; aspirating units; and/or audio/visual devices (e.g., speakers, sounders, flashers, buzzers, microphones, cameras, video displays, video screens, etc.), relay output modules, among other types of fire devices.

When a fire system is installed, commissioned, and/or operating, it can be beneficial to access and review fire system device data of the fire devices of the fire system. For example, a user can review the fire system device data to monitor various fire devices in the fire system. Such a review can allow for a user to determine whether fire devices are operating normally, whether they should be cleaned, replaced, etc.

However, to access such fire system device data, the user has to travel to the facility and manually access the fire system device data. For example, the user has to connect to the fire system on site at the facility to retrieve the fire system device data and review the data in order to monitor the various fire devices in the fire system. Such an approach requires the user to make a site visit to the facility, which can take time and can be costly for the facility. Additionally, the user is usually reactive to when fire devices may malfunction and/or need to be replaced, which may require further site visits in order to address such issues.

Maintenance prediction for devices of a fire system, according to the present disclosure, can allow for remote monitoring of a fire system and associated fire devices utilizing automatically retrieved fire system device data. Such an approach can further allow for predictive maintenance to be performed, allowing fire devices to be cleaned/replaced prior to such devices malfunctioning. Accordingly, site visits to the facility can be reduced, which can reduce costs associated with the fire system as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 502 in FIG. 5.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for maintenance prediction for devices of a fire system, in accordance with one or more embodiments of the present disclosure. The system 100 can include a computing device 102, a fire system 104, a gateway device 110, a mobile device 112, and a computing device 114.

As mentioned above, the system 100 can be included in a facility, a space in a facility, etc. The system 100 can include a fire system 104. The fire system 104 can include a device/series of devices in order to detect events and/or process and/or analyze the detected events to determine whether to generate an alarm for occupants of the facility.

The fire system 104 can include a fire device 108. The fire device 108 can be a device to detect an event and transmit the detected event for processing and/or analysis. As mentioned above, the fire device 108 can include, for example, cameras, motion sensors, fire sensors, smoke detectors, heat detectors, carbon monoxide (CO) detectors, or combinations of these; interfaces; manual call points (MCPs), pull stations; input/output modules; aspirating units; sprinkler controls; and/or audio/visual devices (e.g., speakers, microphones, cameras, video displays, video screens, etc.), relay output modules, among other types of event devices.

Although the fire system 104 is illustrated in FIG. 1 as including a single fire device 108, embodiments of the present disclosure are not so limited. For example, the fire system 104 can include more than one fire device 108.

The fire system 104 can further include a fire panel 106. The fire panel 106 can be utilized to control the various devices included in the fire system 104, including the fire device 108.

The fire panel 106 can be connected to the computing device 102. For example, the fire panel 106 may be connected to the computing device 102 via a gateway device 110. The gateway device 110 can be a device (e.g., a building system gateway) that provides a communication link between the fire panel 106 for fire device 108, computing device 102, and any peripheral devices (e.g., mobile device 112, computing device 114, etc.). For example, the gateway device 110 can enable transmission of data (e.g., fire system device data) from the fire panel 106 of the facility to a cloud computing platform (e.g., the computing device 102), as well as accessibility to the fire panel 106 by a peripheral device (e.g., the mobile device 112, the computing device 114). Additionally, the gateway device 110 can allow for the mobile device 112 and/or the computing device 114 to access and/or determine information about the fire device 108 of the fire system 104.

The mobile device 112 can additionally be included in the system 100. As used herein, a mobile device can include devices that are (or can be) carried and/or worn by the user. The mobile device 112 can be a phone (e.g., a smart phone), a tablet, a personal digital assistant (PDA), a laptop, smart glasses, and/or a wrist-worn device (e.g., a smart watch), among other types of mobile devices. Although not illustrated in FIG. 1 for clarity and so as not to obscure embodiments of the present disclosure, the mobile device 112 can include a user interface. Additionally, although not illustrated in FIG. 1 for clarity and so as not to obscure embodiments of the present disclosure, the computing device 114 can include a user interface.

As illustrated in FIG. 1, the mobile device 112, the computing device 114, and the fire system 104 (e.g., via the gateway device 110) can be connected to the computing device 102. The mobile device 112, the computing device 114, and the fire system 104 can be connected to the computing device 102 via a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As mentioned above, the fire panel 106 can be connected to the fire device 108 to control the fire device 108. For example, the fire panel 106 can cause the fire device 108 to generate an alarm to warn occupants of the facility of an emergency event that is occurring. Additionally, the fire panel 106 can receive operational data from the fire device 108. Operational data from the fire device 108 can include, for example, data describing operating conditions and parameters of the fire device 108. Such data can include, for instance, device sensitivity, sensor readings (e.g., smoke content, heat levels, etc.), among other types of operational data. Such data can be stored at the fire panel 106 for retrieval by the computing device 102, as is further described herein.

As mentioned above, the computing device 102 can retrieve fire system device data from the fire panel 106. The fire system device data can include the operational data from the fire device 108, as well as other supplementary data about the fire device 108. The fire system device data can include, for example, a device age of the fire device 108 (e.g., age since manufacturing date), amount of operating hours of the fire device 108 (e.g., since being installed in the fire system 104), device condition changes (e.g., normal state, pre-alarm state, alarm state, etc.), device sensitivity changes (e.g., changes in sensitivity of a sensor included in the fire device 108), date the fire device 108 was last tested, fire/fault history of the fire device 108 (e.g., how many times the fire device 108 went into fire or fault states automatically (10 times, where 8 were false alarms, 1 was a test alarm, and 1 was a real alarm)), history of the fire device 108 being disabled when it reported a fire, device replacement information (e.g., when a device was last replaced at the installation address of the fire system 104 associated with the location of the fire device 108), device input voltage and current information, device hardware type changed (e.g., when the type of fire device 108 was changed (such as from a smoke detector to a heat detector)), device isolator changed, and/or historical device data from the fire device 108 and/or other fire devices of similar device type in the facility or in use at large (e.g., which may be saved locally at the computing device 102, in some examples), among other examples of fire system device data.

The computing device 102 can retrieve the fire system device data (e.g., via the gateway device 110) according to a predetermined schedule. For example, the computing device 102 can retrieve the fire system device data from the fire panel 106 every 6 hours. However, embodiments of the present disclosure are not limited to every 6 hours. For instance, the computing device 102 can retrieve the fire system device data from the fire panel 106 at a frequency that is more frequent than every 6 hours (e.g., every 3 hours) or less frequent than every 6 hours (e.g., every 2 days).

As mentioned above, the fire system device data can be retrieved by the computing device 102 from the fire panel 106. Such fire system device data can be represented by condition codes. The condition codes can correspond to a status of the fire device 108. For example, the device age of the fire device 108 can be a first condition code, fire/fault history of the fire device 108 can be a second condition code, etc.

Based on the fire system device data, the computing device 102 can generate a fire device analysis. The fire device analysis can include a predicted behavior of the fire device and a predicted timeline of the predicted behavior. As used herein, the term "predicted behavior" refers to forecasting a response to a particular stimulus. For example, the computing device 102 can utilize machine learning techniques utilizing the fire system device data in order to forecast a response the fire device 108 may take when a certain input to the fire device 108 occurs, as is further described herein with respect to FIGS. 2-4. Such a predicted behavior can include the fire device 108 entering a false alarm state, entering a maintenance state, and/or entering a replacement state, as is further described herein with respect to FIGS. 2, 3, and 4, respectively.

As mentioned above, the fire device analysis can further include a predicted timeline of the predicted behavior. As used herein, the term "predicted timeline" refers to forecasting a representation of an event occurring at a particular time. For example, the computing device 102 can additionally utilize machine learning techniques utilizing the fire system device data in order to forecast when a certain response is taken by the fire device 108 when a certain input to the fire device 108 occurs, as is further described herein with respect to FIGS. 2-4. For example, the predicted timeline can be a predicted time at which the device enters the false alarm state, a predicted time at which the device enters the maintenance state, and/or a predicted time at which the device enters the device replacement state, as is further described herein with respect to FIGS. 2, 3, and 4, respectively.

Based on the fire device analysis, the computing device 102 can transmit a notification based on the predicted behavior and/or the predicted timeline for the predicted behavior. For example, the fire device analysis may predict that the fire device 108 is to enter a false alarm state in a certain time period (e.g., five days), and in response, the computing device 102 can transmit a notification to notify a user of such a prediction and when it may occur. The user may, in response, take certain steps to prevent the fire device 108 entering the false alarm state, such as cleaning the fire device 108, replacing the fire device 108, etc.

The fire device analysis and/or the notification may be transmitted to the mobile device 112. For example, the computing device 102 can cause the user interface of the mobile device 112 (e.g., not illustrated in FIG. 1) to display the fire device analysis and/or the notification to allow the user of the mobile device 112 to take steps in response to the predicted behavior and/or the predicted timeline for the predicted behavior included in the fire device analysis.

Additionally, the fire device analysis and/or the notification may be transmitted to the computing device 114. For example, the computing device 102 can cause the user interface of the computing device 114 (e.g., not illustrated in FIG. 1) to display the fire device analysis and/or the notification to allow the user of the computing device 114 to take steps in response to the predicted behavior and/or the predicted timeline for the predicted behavior included in the fire device analysis.

As mentioned above, the predicted behavior of the fire device 108 can include the fire device 108 entering a false alarm state and/or a predicted timeline for the fire device 108 entering the false alarm state, as is further described in connection with FIG. 2. Additionally, the predicted behavior of the fire device 108 can include the fire device 108 entering a maintenance state and/or a predicted timeline for the fire device 108 entering the maintenance state, as is further described in connection with FIG. 3. Further, the predicted behavior of the fire device 108 can include the fire device 108 entering a replacement state and/or a predicted timeline for the fire device 108 entering the replacement state, as is further described in connection with FIG. 4.

Figure 2:
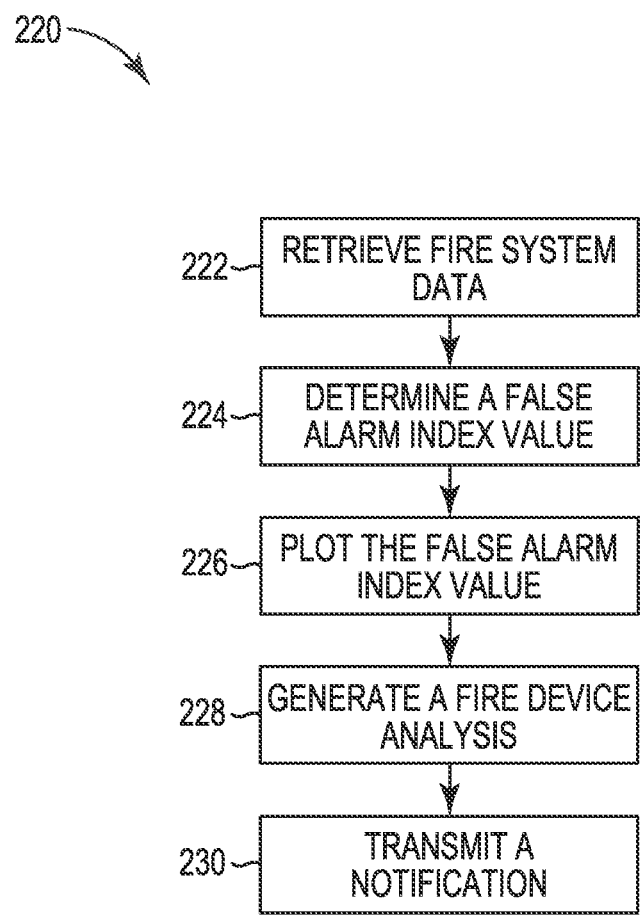
FIG. 2 is an example of a flowchart of a method for maintenance prediction of a false alarm state for devices of a fire system, in accordance with one or more embodiments of the present disclosure.

FIG. 2 is an example of a flowchart of a method 220 for maintenance prediction of a false alarm state for devices of a fire system, in accordance with one or more embodiments of the present disclosure. The method 220 can be performed by a computing device, a fire system including a fire device and a fire panel, and a gateway device (e.g., computing device 102, fire system 104 including fire device 108 and fire panel 106, and gateway device 110, respectively, previously described in connection with FIG. 1).

As previously described in connection with FIG. 1, at 222 the computing device can retrieve fire system data of a fire device in a fire system according to a predetermined schedule. For example the computing device can retrieve the fire system device data from a fire panel (e.g., via a gateway device) every 6 hours. The fire system device data can include operational data from the fire device, as well as other supplementary data, such as historical device data (e.g., which may be saved locally at the computing device).

As mentioned above, certain predicted behavior can include the fire device entering a false alarm state. As used herein, the term "false alarm state" refers to an erroneous reporting of an emergency event when no emergency event is taking place. To determine a predicted behavior false alarm state and a predicted timeline for the false alarm state, at 224, the computing device can determine a false alarm index value. As used herein, the term "index value" refers to a statistical value that an event may occur based on data. The false alarm index value of the fire device going into a false alarm state is based on condition codes included in the fire system device data and historical device data, as is further described herein.

The false alarm index value can be a function of various condition codes as well as historical device data. For example, certain condition codes such as the fire device sensitivity value, number of times the fire device went into a pre-alarm and/or an alarm state, how long the fire device stayed in pre-alarm state, amount of time the fire device took to go from the pre-alarm state to the alarm state, how many other corresponding fire devices in the fire system went into pre-alarm/alarm state and any physically proximate fire devices in the fire system that did not go into pre-alarm/alarm state at the same time, number of times the fire device went into a maintenance state from the installation date of the fire device, amount of dust accumulated on the fire device, whether and how often a type of fire device at the particular installation address of the fire device is changed, among other types of condition codes, as well as historical device data can be utilized in order to generate a statistical value (e.g., the false alarm index value) as to the likelihood of the fire device going into a false alarm state. In other words, the computing device can determine, based on condition codes and historical device data, the probability that the fire device can enter a false alarm state, represented by the false alarm index value. In one example, based on the condition codes above and the historical device data, the computing device can determine the false alarm index value to be 0.8. In another example, based on the condition codes above and the historical device data, the computing device can determine the false alarm index value to be 0.6.

Additionally, at 226, the computing device can plot the false alarm index value against an age of the fire device and false alarm index values for other fire devices that are of a same device type as the fire device in order to generate a predicted timeline for which the fire device may enter the false alarm state. For example, the fire device may be a smoke detector. Utilizing false alarm index values for other smoke detectors (e.g., stored in a database, locally at the computing device or remote from the computing device), the computing device can generate a plot defined by false alarm index values on one axis (e.g., the Y-axis) and the age of the device (e.g., the X-axis) and plot the false alarm index value on the generated plot, where the false alarm index value is defined by the X-Y coordinates of device age and false alarm index value, respectively.

Accordingly, at 228, the computing device can generate the fire device analysis. The fire device analysis can include the predicted behavior (e.g., the fire device is to enter a false alarm state) of the fire device and/or the predicted timeline for when the fire device is to enter the false alarm state.

In response to the false alarm index value exceeding an index threshold value (e.g., the false alarm index value is determined above to be 0.8 and the index threshold is 0.7), the computing device can generate and transmit the fire device analysis and/or a notification (e.g., to a mobile device, to another computing device, etc.). For example, the false alarm index value and the predicted timeline can indicate that there is an 80% chance the fire device is going to generate a false alarm within 30 days based on the condition codes and historical device data. Additionally, if the fire device exceeds a certain age threshold (e.g., the fire device has been operating in the facility for 9 years), there is an 80% chance the fire device is going to generate a false alarm within 30 days because of its age. In an example in which the false alarm index value does not exceed the index threshold, the computing device can refrain from generating a notification, as it is not likely that the fire device enters the false alarm state.

Based on the notification, a user can take remedial actions with respect to the fire device. For example, the user may travel to the facility to perform maintenance on the fire device, clean the fire device, test the fire device, replace the fire device, etc. in order to try to prevent the fire device from entering the false alarm state.

Figure 3:
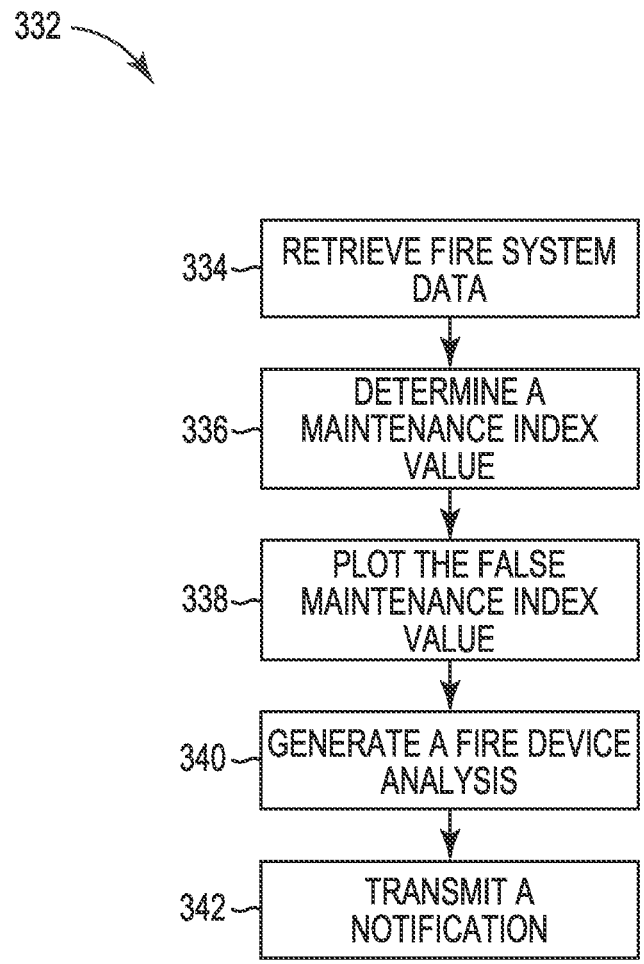
FIG. 3 is an example of a flowchart of a method for maintenance prediction of a maintenance state for devices of a fire system, in accordance with one or more embodiments of the present disclosure.

FIG. 3 is an example of a flowchart of a method 332 for maintenance prediction of a maintenance state for devices of a fire system, in accordance with one or more embodiments of the present disclosure. The method 332 can be performed by a computing device, a fire system including a fire device and a fire panel, and a gateway device (e.g., computing device 102, fire system 104 including fire device 108 and fire panel 106, and gateway device 110, respectively, previously described in connection with FIG. 1).

As previously described in connection with FIG. 1, at 334 the computing device can retrieve fire system data of a fire device in a fire system according to a predetermined schedule. For example the computing device can retrieve the fire system device data from a fire panel (e.g., via a gateway device) every 6 hours. The fire system device data can include operational data from the fire device, as well as other supplementary data, such as historical device data (e.g., which may be saved locally at the computing device).

As mentioned above, certain predicted behavior can include the fire device entering a maintenance state. As used herein, the term "maintenance state" refers to a state in which the fire device has a remediable fault. To determine a predicted behavior maintenance state and a predicted timeline for the maintenance state, at 336, the computing device can determine a maintenance index value. The maintenance index value of the fire device going into a maintenance state is based on condition codes included in the fire system device data and historical device data, as is further described herein.

The maintenance index value can be a function of various condition codes as well as historical device data. For example, certain condition codes such as a trend of dust accumulation on the fire device, historical instances of the fire device entering a maintenance state from the installation date of the fire device, environmental conditions (e.g., positive/negative/neutral air pressure in the space in the facility in which the fire device is located), whether and how often a type of fire device at the particular installation address of the fire device is changed, power consumption trends, installation location of the fire device (e.g., above or below a ceiling), among other types of condition codes, as well as historical device data can be utilized in order to generate a statistical value (e.g., the maintenance index value) as to the likelihood of the fire device going into a maintenance state. In other words, the computing device can determine, based on condition codes and historical device data, the probability that the fire device can enter a maintenance state, represented by the maintenance index value. In one example, based on the condition codes above and the historical device data, the computing device can determine the maintenance index value to be 0.8. In another example, based on the condition codes above and the historical device data, the computing device can determine the maintenance index value to be 0.5.

Additionally, at 338, the computing device can plot the maintenance index value against a service window for the fire device and maintenance index values for other fire devices that are of a same device type as the fire device in order to generate a predicted timeline for which the fire device may enter the maintenance state. For example, the fire device may be a smoke detector. Utilizing maintenance index values for other smoke detectors (e.g., stored in a database, locally at the computing device or remote from the computing device), the computing device can generate a plot defined by maintenance index values on one axis (e.g., the Y-axis) and a maintenance service time range for the fire device (e.g., the X-axis) and plot the maintenance index value on the generated plot, where the maintenance value is defined by the X-Y coordinates of maintenance service time range and maintenance index value, respectively.

Accordingly, at 340, the computing device can generate the fire device analysis. The fire device analysis can include the predicted behavior (e.g., the fire device is to maintenance state) of the fire device and/or the predicted timeline for when the fire device is to enter the maintenance state.

In response to the maintenance index value exceeding an index threshold (e.g., the maintenance index value is determined above to be 0.8 and the index threshold is 0.6), the computing device can generate and transmit the fire device analysis and/or a notification (e.g., to a mobile device, to another computing device, etc.). For example, the maintenance index value and the predicted timeline can indicate that there is an 90% chance the fire device is going to enter a maintenance state in 9 weeks based on the condition codes and historical device data. In an example in which the false alarm index value does not exceed the index threshold, the computing device can refrain from generating a notification, as it is not likely that the fire device enters the maintenance state.

Based on the notification, a user can take remedial actions with respect to the fire device. For example, the user may travel to the facility to perform preemptive maintenance on the fire device, clean the fire device, test the fire device, replace the fire device, etc. in order to try to prevent the fire device from entering the false alarm state.

Figure 4:
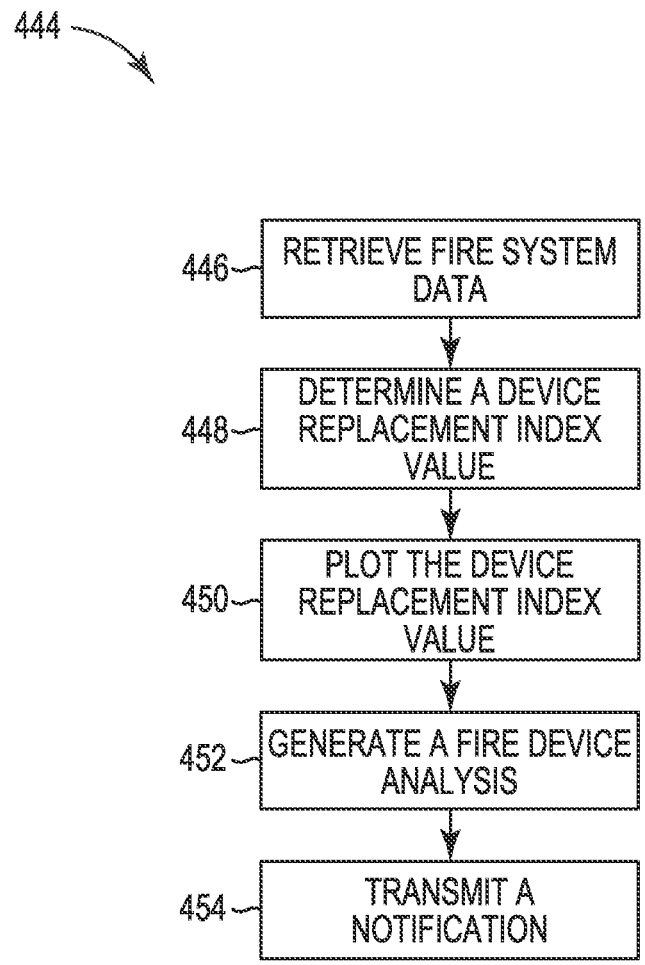
FIG. 4 is an example of a flowchart of a method for replacement prediction of a device replacement state for devices of a fire system, in accordance with one or more embodiments of the present disclosure.

FIG. 4 is an example of a flowchart of a method 444 for replacement prediction of a device replacement state for devices of a fire system, in accordance with one or more embodiments of the present disclosure. The method 444 can be performed by a computing device, a fire system including a fire device and a fire panel, and a gateway device (e.g., computing device 102, fire system 104 including fire device 108 and fire panel 106, and gateway device 110, respectively, previously described in connection with FIG. 1).

At 446 the computing device can retrieve fire system data of a fire device in a fire system according to a predetermined schedule. For example the computing device can retrieve the fire system device data from a fire panel (e.g., via a gateway device) every 6 hours. The fire system device data can include operational data from the fire device, as well as other supplementary data, such as historical device data (e.g., which may be saved locally at the computing device).

As mentioned above, certain predicted behavior can include the fire device entering a device replacement state. As used herein, the term "device replacement state" refers to a state in which the fire device has a non-remediable fault. To determine a predicted behavior device replacement state and a predicted timeline for the device replacement state, at 448, the computing device can determine a device replacement index value. The device replacement index value of the fire device going into a device replacement state is based on condition codes included in the fire system device data and historical device data, as is further described herein.

The device replacement index value can be a function of various condition codes as well as historical device data. For example, certain condition codes such as amount of operating hours of the fire device (e.g., since being installed in the fire system), device replacement information (e.g., when a device was last replaced at the installation address of the fire system associated with the location of the fire device, how frequently it is replaced, etc.), among other types of condition codes, as well as historical device data can be utilized in order to generate a statistical value (e.g., the device replacement index value) as to the likelihood of the fire device going into a device replacement state. In other words, the computing device can determine, based on condition codes and historical device data, the probability that the fire device can enter a device replacement state, represented by the device replacement index value. In one example, based on the condition codes above and the historical device data, the computing device can determine the device replacement index value to be 0.8. In another example, based on the condition codes above and the historical device data, the computing device can determine the device replacement index value to be 0.6.

Additionally, at 450, the computing device can plot the device replacement index value against an age of the fire device and device replacement index values for other fire devices that are of a same device type as the fire device in order to generate a predicted timeline for which the fire device may enter the device replacement state. For example, the fire device may be a heat detector. Utilizing device replacement index values for other heat detectors (e.g., stored in a database, locally at the computing device or remote from the computing device), the computing device can generate a plot defined by device replacement index values on one axis (e.g., the Y-axis) and the age of the device (e.g., the X-axis) and plot the device replacement index value on the generated plot, where the device replacement index value is defined by the X-Y coordinates of device age and device replacement index value, respectively.

Accordingly, at 452, the computing device can generate the fire device analysis. The fire device analysis can include the predicted behavior (e.g., the fire device is to enter a device replacement state) of the fire device and/or the predicted timeline for when the fire device is to enter the device replacement state.

In response to the device replacement index value exceeding an index threshold (e.g., the device replacement index value is determined above to be 0.8 and the index threshold is 0.7), the computing device can generate and transmit the fire device analysis and/or a notification (e.g., to a mobile device, to another computing device, etc.). For example, the device replacement index value and the predicted timeline can indicate that there is an 80% chance the fire device is going to enter a device replacement state within 30 days based on the condition codes and historical device data. Additionally, if the fire device exceeds a certain age threshold (e.g., the fire device has been operating in the facility for 9 years), there is an 80% chance the fire device is going to enter a device replacement state within 30 days because of its age. In an example in which the device replacement index value does not exceed the index threshold, the computing device can refrain from generating a notification, as it is not likely that the fire device enters the device replacement state.

As previously described above (e.g., in connection with FIGS. 2, 3, and 4), the fire device analysis can include predicted behavior including the fire device entering a false alarm state and a predicted timeline for the fire device entering the false alarm state, entering a maintenance state and a predicted timeline for the fire device entering the maintenance state, or entering a replacement state and a predicted timeline for the fire device entering the replacement state. However, the fire device analysis can include all three predicted behaviors (and/or associated timelines) and/or combinations thereof.

Accordingly, maintenance prediction for devices of a fire system can inform a user of any predicted behaviors for fire devices in a fire system of a facility. Such predictions can allow for predictive maintenance and/or device replacement to be performed, which can prevent the fire system from emitting false alarms when an emergency event is not actually occurring and/or preventing fire devices from malfunctioning during a real emergency event. Monitoring of the health of the fire system can be performed remotely from the facility, which can reduce site visits to the facility and reduce costs associated with the fire system as compared with previous approaches.

Figure 5:
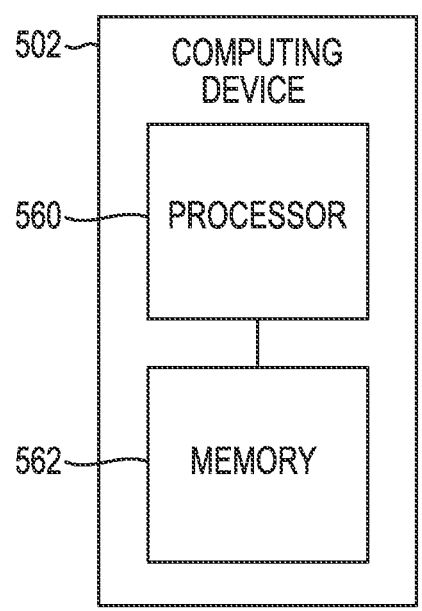
FIG. 5 is an example of a computing device for maintenance prediction for devices of a fire system, in accordance with one or more embodiments of the present disclosure.

FIG. 5 is an example of a computing device 502 for maintenance prediction for devices of a fire system, in accordance with one or more embodiments of the present disclosure. As illustrated in FIG. 5, the computing device 502 can include a memory 562 and a processor 560 for maintenance prediction for devices of a fire system, in accordance with the present disclosure.

The memory 562 can be any type of storage medium that can be accessed by the processor 560 to perform various examples of the present disclosure. For example, the memory 562 can be a non-transitory computer readable medium having computer readable instructions (e.g., executable instructions/computer program instructions) stored thereon that are executable by the processor 560 for maintenance prediction for devices of a fire system in accordance with the present disclosure.

The memory 562 can be volatile or nonvolatile memory. The memory 562 can also be removable (e.g., portable) memory, or non-removable (e.g., internal) memory. For example, the memory 562 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 562 is illustrated as being located within computing device 502, embodiments of the present disclosure are not so limited. For example, memory 562 can also be located internal to another computing resource (e.g., enabling computer readable instructions to be downloaded over the Internet or another wired or wireless connection).

The processor 560 may be a central processing unit (CPU), a semiconductor-based microprocessor, and/or other hardware devices suitable for retrieval and execution of machine-readable instructions stored in the memory 562.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for maintenance prediction for devices of a fire system, comprising:
a memory; and
a processor configured to execute executable instructions stored in the memory to:
receive fire system device data of a fire device in a fire system; and
generate a fire device analysis based on the fire system device data including:
determining a predicted behavior of the fire device by determining a maintenance index value of the fire device going into a maintenance state based on a condition code included in the fire system device data and historical device data; and
generating a predicted timeline for which the fire device enters the maintenance state by plotting the maintenance index value against a maintenance service time range for other fire devices that are of a same device type as the fire device included in a database.

2. The computing device of claim 1, wherein the processor is configured to execute the instructions to transmit a notification based on at least one of the predicted behavior and the predicted timeline for the.

3. The computing device of claim 1, wherein the processor is configured to execute the instructions to receive the fire system device data by retrieving the fire system device data from the fire system according to a predetermined schedule.

4. The computing device of claim 1, wherein
the predicted timeline includes a predicted time at which the device enters the maintenance state.

5. The computing device of claim 1, wherein the fire system device data includes the condition code corresponding to a status of the fire device.

6. The computing device of claim 1, wherein the condition code includes at least one of:
a trend of dust accumulation on the fire device;
historical instances of the fire device entering the maintenance state from an installation date of the fire device; and
environmental conditions in which the fire device is located.

7. A non-transitory computer readable medium having computer readable instructions stored thereon that are executable by a processor to:
retrieve fire system device data of a fire device in a fire system according to a predetermined schedule;
generate a fire device analysis based on the fire system device data including:
determining a predicted behavior of the fire device by determining a false alarm index value of the fire device going into a false alarm state based on a condition code included in the fire system device data and historical device data; and
generating a predicted timeline for which the fire device enters the false alarm state by plotting the false alarm index value against an age of the fire device and false alarm index values for other fire devices that are of a same device type as the fire device included in a database; and
transmit a notification about the predicted behavior based on the fire device analysis.

8. The computer readable medium of claim 7, wherein the computer readable instructions are executable by the processor to
transmit, in response to the false alarm index value exceeding a threshold value, the notification.

9. The computer readable medium of claim 7, wherein the condition code includes at least one of:
a sensitivity value of the fire device;
an amount of times the fire device went into a pre-alarm state or an alarm state;

an amount of time the fire device stayed in the pre-alarm state or the alarm state; and whether any physically proximate fire devices in the fire system did not go into the pre-alarm state or the alarm state.

10. A system for maintenance prediction for devices of a fire system, comprising:

a fire system including a fire device and a fire panel connected to the fire device and configured to receive operational data from the fire device; and a computing device connected to the fire panel of the fire system, the computing device configured to:

retrieve fire system device data from the fire panel, the fire system device data including the operational data;

generate a fire device analysis based on the fire system device data including:

determining a predicted behavior of the fire device by determining a device replacement index value of the fire device going into a device replacement state based on a condition code included in the fire system device data and historical device data; and generating a predicted timeline for which the fire device enters the device replacement state by plotting the device replacement index value against an age of the fire device and device replacement index values for other fire devices that are of a same device type as the fire device included in a database; and transmit a notification about the predicted behavior based on the fire device analysis.

11. The system of claim 10, wherein the computing device is configured to retrieve the fire system device data via a gateway device connected to the computing device and to the fire panel.

12. The system of claim 10, wherein the system further includes a mobile device.

13. The system of claim 12, wherein the computing device is configured to cause the mobile device to display, on a user interface of the mobile device, the fire device analysis.

14. The system of claim 12, wherein the computing device is configured to cause the mobile device to display, on a user interface of the mobile device, the notification.

15. The system of claim 10, wherein the fire system device data includes the historical device data.

16. The system of claim 10, wherein in response to the device replacement index value exceeding a threshold value, the computing device is configured to transmit the notification.

17. The system of claim 10, wherein the condition code includes at least one of:

an amount of operating hours of the fire device;

when a fire device was last replaced at an installation address of the fire system associated with a location of the fire device; and a frequency of fire device replacement at the installation address.

* * * * *